Patented Apr. 22, 1952

2,594,245

UNITED STATES PATENT OFFICE 2,594,245

PREPARATION OF CRYSTALLINE DIHYDRO-STREPTOMYCIN HYDROCHLORIDE

Frank J. Wolf, Westfield, N. J., assignor to Merck & Co., Inc., Rahway, N. J., a corporation of New Jersey No Drawing. Application May 19, 1950, Serial No. 163,105

3 Claims. (Cl. 260—210)

This application is a continuation-in-part of my pending application Serial No. 31,200, filed June 4, 1948, now abandoned.

This invention relates to the preparation of improved antibiotic substances and more particularly to the preparation of dihydrostreptomycin in pure crystalline form.

Dihydrostreptomycin has been prepared from streptomycin by catalytic reduction in water solution in accordance with the procedure in a publication by Peck, Hoffhine and Folkers in J. A. C. S. 68, 1390 (1946). Dihydrostreptomycin can also be prepared from the streptomycin hydrochloride-calcium chloride complex by catalytic reduction thereof in aqueous methanol solution. By either of these procedures, however, the dihydrostreptomycin has been recovered only in the amorphous form and even upon purification by conventional procedures has not been obtained completely pure or even within the range of 5% of absolute purity. The need has nevertheless been recognized for obtaining dihydrostreptomycin in pure form to provide an accurate standard for purity determinations and for clinical evaluation of the compound itself.

Over an extended period of time many attempts were made to purify dihydrostreptomycin by crystallization from various solvents and solvent mixtures. So many attempts of this sort had been made without obtaining any crystalline dihydrostreptomycin that it appeared quite likely that this product was one which could not be obtained in crystalline form. The distinct practical advantage of obtaining a crystalline product, however, spurred further investigations in spite of these negative indications.

As a result of this further investigation it has now been discovered that by following a particular procedure it is possible to produce small crystals of dihydrostreptomycin and that by using these crystals as seeds it is possible to prepare crystalline dihydrostreptomycin in large quantities.

The first crystal of dihydrostreptomycin hydrochloride was obtained when a methanol solution of dihydrostreptomycin hydrochloride (40 mg./cc.) was added to about 15 volumes of acetone and allowed to stand. Instead of the usual formation of a flocculent precipitate the solution merely remained turbid. Upon allowing this turbid solution to stand overnight it was found that a small crystal had formed. This crystal was broken and used to seed a number of other solutions of dihydrostreptomycin hydrochloride in methanol made turbid with acetone, and a substantial amount of crystalline dihydrostreptomycin hydrochloride was thus obtained.

In preparing crystalline dihydrostreptomycin hydrochloride it is advantageous to first obtain the amorphous material in as pure a form as possible. This can be accomplished in various ways. For example, dihydrostreptomycin hydrochloride can be converted to the crystalline helianthate salt which is then purified by recrystallization and then reacting same with hydrochloric acid to recover purified amorphous dihydrostreptomycin hydrochloride. On the other hand, if the dihydrostreptomycin hydrochloride is prepared by reduction of streptomycin hydrochloride which has previously been purified by preparation of the helianthate or streptomycin-calcium chloride double salt, further purification of the dihydrostreptomycin hydrochloride is not necessary.

For the crystallization of dihydrostreptomycin in accordance with the present invention an essentially anhydrous solution of purified dihydrostreptomycin hydrochloride in methanol is prepared. Upon seeding with crystals of the compound and stirring, crystalline dihydrostreptomycin hydrochloride is obtained. The rate of crystallization is materially speeded up by decreasing the relative amount of methanol in said solution so that a condition of supersaturation is obtained. This can be achieved in a number of ways as, for example, by adding additional dihydrostreptomycin hydrochloride or evaporating part of the methanol until the amount of dihydrostreptomycin hydrochloride ranges from 300 to 500 mg./ml.

When treating more dilute solutions, however, the supersaturation can be obtained by adding a solvent miscible with methanol in which dihydrostreptomycin hydrochloride is relatively insoluble. A large number of solvents are suitable for this purpose, the most satisfactory being acetone, isopropanol and ethanol. The amount of added solvent will, of course, depend upon the particular solvent selected and the starting concentration of dihydrostreptomycin in methanol. It is found, however, that when the proper degree of supersaturation is produced in the crystallization mixture, as evidenced by the appearance of distinct turbidity in the mixture, a yield of about 80% of crystalline product is readily obtained.

In order to foster maximum crystal formation the crystallization mixture after seeding is allowed to said with frequent shaking or agitation for a period of from about 15 to 40 hours. It should also be noted that by concentrating the mother liquors remaining after the removal of the first crop of crystals and proceeding as before, additional quantities of crystalline product can be obtained which bring the over-all yield of crystalline dihydrostreptomycin hydrochloride to as much as 95%.

It has been found that two distinct crystalline forms of dihydrostreptomycin hydrochloride can be obtained depending upon the conditions employed in drying the crystals. When dried under vacuum for periods up to 24 hours at temperatures ranging from room temperature to about 60° C. the crystals contain bound methanol and have a distinct crystal form when subjected to X-ray and microscopic examination. On the other hand, if the crystals are further dried by heating under vacuum for about 4 hours at a temperature of about 100° C. crystals are obtained which are essentially free of methanol and have a different characteristic crystal form.

The amount of methanol in the methanol containing crystals varies with the drying temperature. Heating under vacuum at a temperature of about 56° C. gives a product containing (by analysis) 3 to 4% of methanol which is quite firmly bound, indicating that the amount of firmly bound methanol is one mole per mole of dihydrostreptomycin hydrochloride. Heating at room temperature, however, gives crystals which (by analysis) contain about 10-11% of methanol, indicating that this product contains about three molar equivalents of methanol, i. e., one mole being the firmly bound methanol and two moles being loosely bound methanol not in the crystalline structure. This would account for the fact that crystals dried at room temperature and at 56° C., although differing in methanol content, have the same crystal form.

The following examples show how the process of the present invention can be carried out, but it is to be understood that these examples are given by way of illustration and not of limitation.

EXAMPLE 1

Streptomycin-calcium chloride complex (100 gm.) was dissolved in 500 cc. of water and the solution shaken with hydrogen in the presence of 1 gm. of platinum oxide. After absorption of hydrogen had ceased the solution was filtered from the catalyst and poured with stirring into 10 l. of acetone containing about 100 gm. of "Supercel" (a diatomaceous earth filter aid). The "Supercel" slurry was filtered, washed with acetone, and the dihydrostreptomycin removed by leaching the cake with two 200 cc. portions of methanol and finally washing with 100 cc. of methanol. Amorphous dihydrostreptomycin hydrochloride, essentially free from calcium chloride, was obtained by pouring the methanol solution into 5 l. of isopropanol. After drying, 84 gm. of the amorphous product was obtained.

For crystallization the amorphous product was dissolved in 300 cc. of methanol, seeded and stirred. After 40 hours stirring the crystalline product was filtered and washed with 100 cc. portions of methanol, 80-20 methanol-acetone, 50-50 methanol-acetone, and acetone and dried, yielding 64 gm. (76% yield) of crystalline product. In a duplicate run following the same procedure a yield of 66 gm. of crystalline product (83%) and 10 gm. of amorphous material was obtained.

The crystalline products were recrystallized by dissolving 5 gm. in 7 cc. of boiling methanol, adding acetone to the point of turbidity (45-50 cc.) seeding and stirring. Yields of 3.3 and 3.7 gm. (66 and 74% respectively) were obtained. The products, dried at about 56° C. in vacuo, contain about 4% of methanol, have a specific rotation of −91 to −94 and contain no ash.

EXAMPLE 2

Crystalline dihydrostreptomycin hydrochloride, 56 gm. was dissolved in hot methanol (1400 cc.) and the resultant slightly turbid solution filtered and diluted with acetone to the point of turbidity (ca. 1400 cc.) seeded and stirred for about 40 hours. The product was filtered, washed, and dried yielding 49.0 gm. (80.5%) of crystalline first crop. The mother liquor and washes were combined and concentrated to about 300 cc. acetone again added and seeded. A crystalline product amounting to 8.2 gm. (13.5%) was obtained. The crystals when dried in vacuo at about 56° C. contained about 4% of methanol, indicating the presence of one mole of methanol per mole of dihydrostreptomycin hydrochloride in the crystal structure. Precipitation of the washes and mother liquors in acetone yielded 2 gm. of additional amorphous material.

EXAMPLE 3

A solution of 1800 gm. of crystalline streptomycin-calcium chloride double salt equivalent to 1600 gm. of dry product was dissolved by vigorous stirring in 600 cc. of water and 3 l. of methanol. The viscous solution was reduced using 1.8 gm. of platinum oxide catalyst. After the reduction was complete the mixture was filtered from the catalyst and distilled under reduced pressure with continuous addition of methanol to the distillation vessel. After about 15 l. of methanol had been distilled from the mixture, analysis for water indicated the presence of about 200 gm. of water. Some suspended colloidal catalyst not removed by the initial filtration was removed by adding 10 gm. of activated carbon and filtering. The filtrate, volume about 5 l., was diluted with 1 l. of acetone. The mixture was seeded with 10 gm. of crystalline dihydrostreptomycin hydrochloride and stirred for 16 hours. The product was filtered, washed with 1 l. of methanol, then 50-50 methanol-acetone and finally with acetone and dried. The dry product (770 gm.; 60% yield) contained 0.2% sulfated ash. Upon concentration and seeding of the mother liquor a second crop of 40 gm. was obtained.

EXAMPLE 4

A solution of 5 gm. of crystalline dihydrostreptomycin hydrochloride in 75 cc. of hot methanol was diluted with isopropanol until a faint turbidity remained in the solution (38 cc. were required). The mixture was seeded with crystalline dihydrostreptomycin hydrochloride and allowed to stand 72 hours with occasional shaking. The product was filtered, washed with methanol-isopropanol mixture then isopropanol and dried, in vacuo at about 56° C., yielding 2.9 gm. (68%) of crystalline product.

Pertinent data concerning this product are tabulated below and compared with properties of amorphous dihydrostreptomycin hydrochloride.

| Properties | Amorphous | Crystalline |
|---|---|---|
| Potency (streptomycin units per mg., B. Subtilis cup assay). | 500 | 600. |
| Toxicity LD50 (mg./20 g. mouse) | 3.8–4.2 | 4.4–4.7. |
| Rotation $\alpha$ sp. (c=1 in water) | −87–88 | −92–94. |
| Methanol solubility | Miscible | 1 gm. in 15 cc. |
| Crystalline Characteristics | None | (¹) |
| Purity | ? | 97% or greater. |

¹ Crystalline characteristics.

X-ray diffraction pattern

Spacings and relative intensities measured by the Norelco Geiger-counter X-ray spectrometer are tabulated below for a sample of dihydrostreptomycin trihydrochloride, dried for 4 hours at 100° C.

| Spacing, Å | Relative Intensity, Percent |
|---|---|
| 10.8 | 33 |
| 8.85 | 67 |
| 8.05 | 33 |
| 7.25 | 33 |
| 5.25 | 67 |
| 4.90 | 67 |
| 4.50 | 100 |
| 4.12 | 33 |
| 3.94 | 33 |
| 3.75 | 75 |
| 3.40 | 45 |
| 3.22 | 40 |
| 3.08 | 40 |
| 2.92 | 47 |

Other crystalline characteristics are as follows:

Indices of refraction $\begin{cases} \alpha = 1.522^1 \\ \beta = 1.548^1 \\ \gamma = 1.566^1 \end{cases}$ Birefringence _____ −0.008
Axial angle 2V (calc'd) _____ 80°
Extinction _____ Parallel
Sign of elongation _____ +
Pleochroism _____ Absent
Crystal system _____ Probably Orthorhombic

[1] For the product as dried at 56° C.

EXAMPLE 5

Samples of crystalline dihydrostreptomycin hydrochloride were prepared from various solvents and concentrations. The product was centrifuged and the damp solid examined by X-ray. In addition one of the samples was air-dried at room temperature, dried in vacuo at room temperature, 56° C. and 100° C. With the exception of the 100° C. dried material, all samples had the same crystalline form when examined by X-ray although some samples appeared different to the eye.

Method of crystallization

SAMPLE 1

A methanol solution of dihydrostreptomycin hydrochloride (200 mg./cc.) was diluted with 1/5 volume of isopropanol. Slow crystallization (seeded) on standing produced large rectangular crystals.

SAMPLE 2

A methanol solution of dihydrostreptomycin hydrochloride (400 mg./cc.) and 32 mg./cc. of calcium chloride. Slowly crystallized (seeded). Crystals formed crust on bottom of the flask.

SAMPLE 3

Methanol solution of dihydrostreptomycin hydrochloride (200 mg./cc.). A slight amount of seed crystals was added and the crystals formed slowly.

SAMPLE 4

A methanol solution of dihydrostreptomycin hydrochloride (400 mg./cc.) was seeded and stirred forming fine crystals.

SAMPLE 5

A methanol solution of dihydrostreptomycin hydrochloride (200 mg./cc.) and calcium chloride (80 mg./cc.) seeded was allowed to stand forming large coarse crystals. This sample was air-dried. Methanol content—20%.

Vacuum dried—room temperature—11% methanol
Vacuum dried—56° C.—4% methanol
Vacuum dried—100° C.—0.4% methanol Upon X-ray and microscopic examination, all of the undried samples and the samples dried in vacuo at 56° C. or below were found to have the same crystal form, while the sample dried at 100° C. had a different and distinct crystal form.

Comparative data for samples of crystalline dihydrostreptomycin hydrochloride dried under different conditions are tabulated below.

| Characteristic | Crystals Dried in vacuo | | |
| --- | --- | --- | --- |
| | Sample A (at 25° C.) | Sample B (at 56° C.) | Sample C (at 100° C.) |
| Index of refraction $\begin{cases} \alpha \\ \beta \\ \gamma \end{cases}$ | 1.528±.002<br>1.544±.002<br>1.566±.002 | 1.532±.002<br>1.548±.002<br>1.566±.002 | 1.550±.002<br>1.566±.002<br>1.578±.002 |
| Birefringence | +0.006 | −0.002 | 0.004 |
| Axial Angle 2V (calculated), degrees | 80 | 80 | 78 |
| Methanol Content, percent | 10.2 | 3.1 | 0.4 |
| X-ray Diffraction Pattern | (1) | (1) | (2) |
| Crystalline form | [3] A | [3] A | [3] B |

[1] X-ray Diffraction Pattern for Crystals Dried at 25–56° C.

| Spacing, Å | Relative Intensity, Per Cent | Spacing, Å | Relative Intensity, Per Cent |
|---|---|---|---|
| 13.6 | 70 | 4.05 | 40 |
| 10.4 | 60 | 3.78 | 40 |
| 8.8 | 30 | 3.72 | 40 |
| 8.0 | 20 | 3.62 | 80 |
| 7.2 | 50 | 3.46 | 100 |
| 6.95 | 50 | 3.36 | 50 |
| 6.02 | 20 | 3.28 | 50 |
| 5.30 | 20 | 3.23 | 30 |
| 5.12 | 60 | 3.11 | 20 |
| 5.05 | 70 | 3.06 | 20 |
| 4.81 | 20 | 2.92 | 60 |
| 4.61 | 80 | 2.74 | 30 |
| 4.49 | 50 | 2.67 | 30 |
| 4.33 | 50 | | |
| 4.13 | 60 | | |

[2] X-ray Diffraction Pattern for Crystals Dried at 100° C.
[3] The crystals form designations A and B are arbitrary designations given to the two types of crystals as identified by the characteristic indices of refraction and X-ray diffraction patterns.

| Spacing, Å | Relative Intensity, Per Cent |
|---|---|
| 10.8 | 33 |
| 8.85 | 67 |
| 8.05 | 33 |
| 7.25 | 33 |
| 5.25 | 67 |
| 4.90 | 67 |
| 4.50 | 100 |
| 4.12 | 33 |
| 3.94 | 33 |
| 3.75 | 75 |
| 3.40 | 45 |
| 3.22 | 40 |
| 3.08 | 40 |
| 2.92 | 47 |

The remaining characteristics such as extinction, sign of elongation, pleochroism, and crystal system are the same for both crystal forms.

It has been found that after a number of crystallization of dihydrostreptomycin hydrochloride have been carried out in a particular environment, crystallization of additional amounts of dihydrostreptomycin hydrochloride can sometimes be effected without the actual addition of seed crystals. This is probably due to the presence of minute crystals of dihydrostreptomycin hydrochloride in the apparatus or atmosphere of the environment. In order to provide optimum control of the crystallization and to effect crystallization in the shortest possible time, it is preferable, however, to add seed crystals to the supersaturated solution rather than to rely on the seeding action of minute crystals in the environment.

It is to be understood that novelty of the herein described process resides not only in the procedures for crystallizing dihydrostreptomycin hydrochloride but also in the preferred adaptation of the process wherein the streptomycin hydrochloride calcium chloride complex salt is catalytically reduced and the dihydrostreptomycin hydrochloride thus obtained in amorphous form is converted to the crystalline product by the procedures herein described.

In this preferred adaptation of the process the manner of removing calcium chloride from the reaction mixture following the reduction is of primary significance. This step involves precipitation of dihydrostreptomycin hydrochloride from the methanolic reduction mixture containing calcium chloride with isopropanol, thus forming an amorphous precipitate of dihydrostreptomycin hydrochloride which is readily recovered by filtration. This calcium chloride-free material is well suited for use in the preparation of crystalline dihydrostreptomycin and may also be utilized as a superior quality of amorphous product.

It should further be understood that throughout the specification and claims reference to dihydrostreptomycin hydrochloride denotes the compound which contains 3 molecules of HCl, i. e., dihydrostreptomycin trihydrochloride.

Various changes and modifications in the foregoing procedures will occur to those versed in the art, and to the extent that such changes and modifications fall within the purview of the appended claims, it is to be understood that they constitute part of my invention.

I claim:

1. The process for preparing crystalline dihydrostreptomycin hydrochloride that comprises preparing a methanol solution of dihydrostreptomycin hydrochloride of about 40 mg./cc. concentration, adding a volume of this solution to about 15 volumes of acetone, and allowing the resulting turbid solution to stand until crystals are formed, thereby obtaining crystalline dihydrostreptomycin hydrochloride containing methanol of crystallization.

2. The process for preparing crystalline dihydrostreptomycin hydrochloride that comprises preparing a methanol solution of dihydrostreptomycin hydrochloride of about 40 mg./cc. concentration, adding a volume of this solution to about 15 volumes of acetone, and allowing the resulting turbid solution to stand until crystals are formed, thereby obtaining crystalline dihydrostreptomycin hydrochloride containing methanol of crystallization, and heating the same under vacuum at a temperature of about 100° C. thereby obtaining methanol-free crystalline dihydrostreptomycin hydrochloride.

3. The process for preparing crystalline dihydrostreptomycin hydrochloride that comprises preparing a methanol solution of dihydrostreptomycin hydrochloride of about 40 mg./cc. concentration, adding a volume of this solution to about 15 volumes of acetone, and allowing the resulting turbid solution to stand until crystals are formed, thereby obtaining crystalline dihydrostreptomycin hydrochloride containing methanol of crystallization, and utilizing the crystals there obtained to seed a supersaturated methanolic solution of dihydrostreptomycin hydrochloride in the production of additional crystalline dihydostreptomycin hydrochloride.

FRANK J. WOLF.

REFERENCES CITED

The following references are of record in the file of this patent:

UNITED STATES PATENTS

| Number | Name | Date |
|---|---|---|
| 2,446,102 | Peck | July 27, 1948 |
| 2,462,175 | Folkers | Feb. 22, 1949 |
| 2,498,574 | Peck | Feb. 21, 1950 |
| 2,552,547 | Fried et al. | May 15, 1951 |

OTHER REFERENCES

Le Page, J. Biol. Chem., vol. 162 (1946), page 167.

Fried et al., Jour. Amer. Chem. Soc., vol. 69, page 83 (1947).

Bartz et al., Jour. Amer. Chem. Soc., vol. 68, pages 2163–2166 (1946).

I. A. Solomons et al., Science, vol. 109, page 515 (1949).